Oct. 1, 1963  R. A. CLAPP  3,105,410
PHOTOGRAPHIC PRINTER
Filed March 6, 1959  7 Sheets-Sheet 1

FIG. 1

INVENTOR
ROY A. CLAPP
Caswell & Lagaard
ATTORNEYS

Oct. 1, 1963  R. A. CLAPP  3,105,410
PHOTOGRAPHIC PRINTER
Filed March 6, 1959  7 Sheets-Sheet 2

INVENTOR
ROY A. CLAPP
Caswell & Lagaard
ATTORNEYS

FIG. 3

INVENTOR
ROY A. CLAPP
Caswell & Lagaard
ATTORNEYS

Oct. 1, 1963  R. A. CLAPP  3,105,410
PHOTOGRAPHIC PRINTER
Filed March 6, 1959  7 Sheets-Sheet 6

FIG. 9

INVENTOR
ROY A. CLAPP
Caswell & Lagaard
ATTORNEYS

United States Patent Office 3,105,410
Patented Oct. 1, 1963

3,105,410
PHOTOGRAPHIC PRINTER
Roy A. Clapp, Minneapolis, Minn., assignor to Pako Corporation, Minneapolis, Minn., a corporation of Delaware
Filed Mar. 6, 1959, Ser. No. 797,786
7 Claims. (Cl. 88—24)

The herein disclosed invention relates to photographic printers and particularly to a printer having a supporting structure, an illuminating section carried thereby, a negative section also carried by said supporting structure, an optical section having an objective lens system, and a paper section, said optical section and said paper section being movable relative to one another and relative to the negative section along the optical axis.

An object of the invention resides in providing a photographic printer in which enlargements can be made from a one to one ratio or less up to a one to five ratio or more.

Another object of the invention resides in providing a printer in which the movable sections may be moved jointly and at different rates to provide auto-focus.

A still further object of the invention resides in providing a printer in which two separate cams and cam followers are used to simultaneously move the movable sections at the desired rates.

An object of the invention resides in providing a printer having a revoluble member and on which helical cams are disposed each having a varying lead throughout its extent.

Another object of the invention resides in designing the cams for a lens system of nominal focal length and in providing optical compensating means operable in combination with the objective lens system to compensate for differences between the actual focal length of the objective lens system and the nominal focal length.

A still further object of the invention resides in utilizing as the compensating means two spaced meniscus lenses variable as to spacing.

Other objects of the invention reside in the novel combination and arrangement of parts and in the details of construction hereinafter illustrated and/or described.

This application is a continuation in part of my copending application for patent, Serial No. 790,226, filed January 30, 1959, for Photographic Printer. Only so much of the original disclosure as relates to the present invention has been shown and will be described in this application, recourse being had to the said present application for the illustration and description of the other portions of the printer.

The photographic printing apparatus, constituting the instant invention, is mounted on a table A which supports the various sections of the same. Extending upwardly from said table at one end thereof is a column B which supports a paper section C and an optical section F. These two sections are movable in an up and down direction along the optical axis to determine the amount of enlargement and to focus the image on the paper. Mounted on the table at the intermediate portion of the same is an illuminating section D by means of which light may pass through a negative carried by a negative holder E disposed at the upper surface of the table A. The various sections of the invention will now be described.

*The Table*

Figure 1:
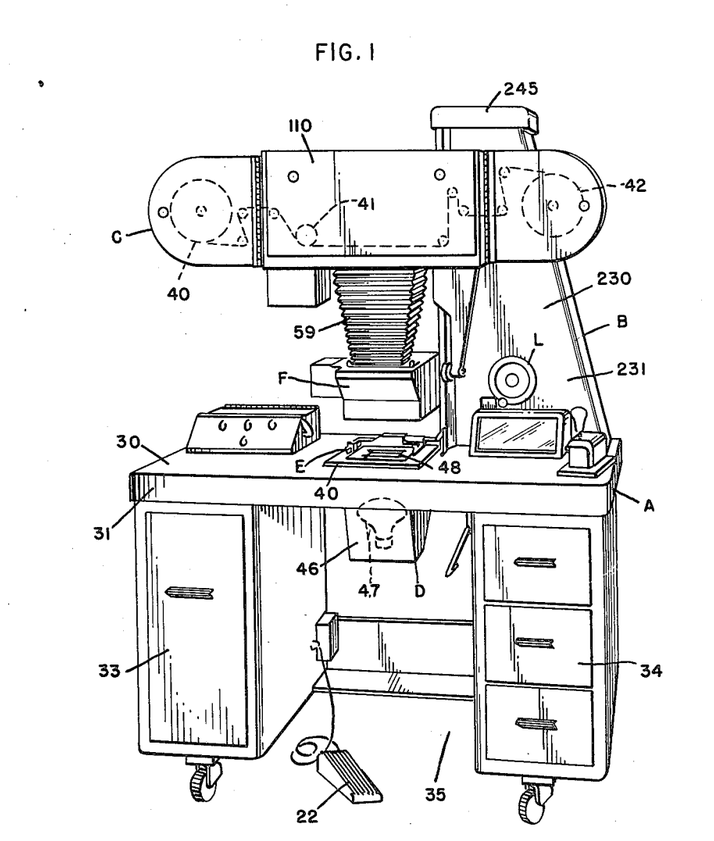
FIG. 1 is a perspective view of a photographic printer illustrating an embodiment of the invention applied thereto.
Figure 2:
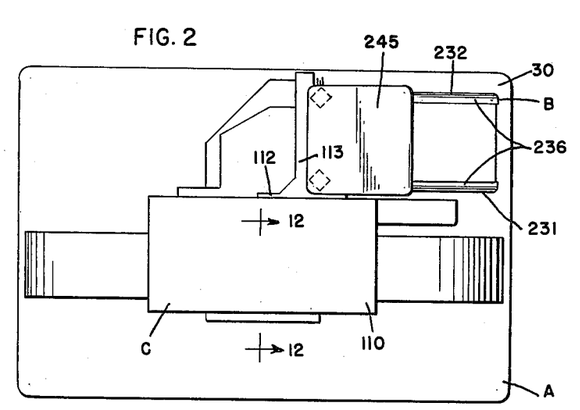
FIG. 2 is a plan view of the structure shown in FIG. 1.
Figure 3:
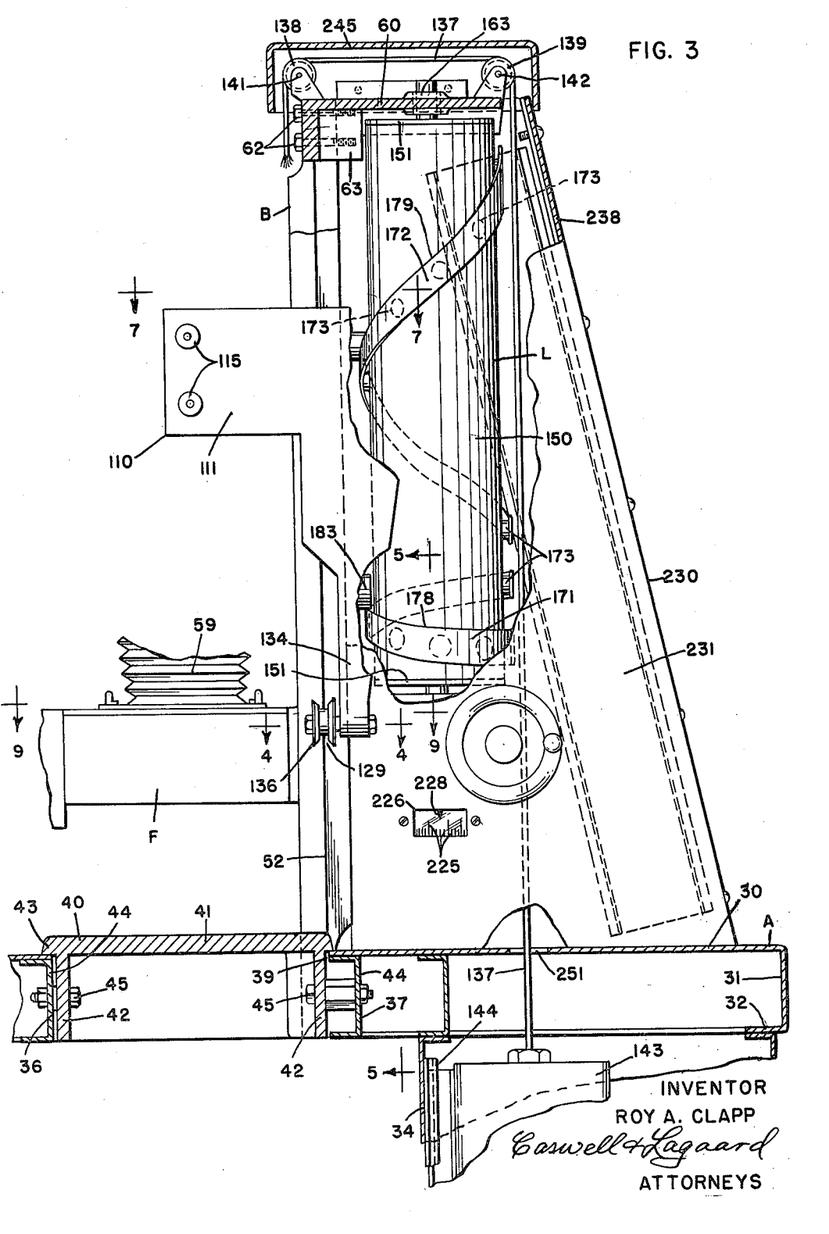
FIG. 3 is a fragmentary elevational view of a portion of the printer including the supporting column and the parts movable therewith.
Figure 4:
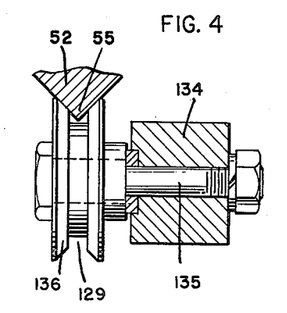
FIG. 4 is a fragmentary plan sectional view taken on line 4—4 of FIG. 3 and drawn to a greater scale.

Table A, best shown in FIGS. 1, 2 and 3, consists of a table top 30 which is constructed of sheet metal and which has depending flanges 31 at the marginal portions of the same. Lips 32 extend inwardly from the lower edges of the flanges 31 and form a box-like structure for the top. The top 30 rests upon two standards 33 and 34 spaced from one another to form a knee space 35 therebetween. These standards contain certain of the electrical components of the invention which have not been disclosed in this application. The top 30 has spot welded to the underside thereof a number of reinforcing members 36 and 37 which are in the form of channels and extend downwardly from said table top. Between these reinforcing members is formed an opening 39. Mounted on the table top is an insert 40 constructed in the form of a casting. This insert has a top 41 and flanges 42 depending therefrom. The insert 40 extends through the opening 39 in the table top 30 and the marginal portion 43 of the same rests directly on the top and is supported through the reinforcing members 36 and 37. The flanges 42 are bolted to the webs 44 of these reinforcing members by means of bolts 45. In this manner the insert 40 is rigidly supported by and attached to the table top 30.

*Illuminating Section*

Below the table top 30 is disposed the illuminating section D, shown in FIG. 1, which comprises a housing 46 containing a lamp 47. This lamp causes light to pass through an opening 48 in the negative holder E and through a negative mounted therein. As far as the instant invention is concerned, the illuminating section forms no particular feature of the invention, and any suitable illuminating section such as now well known in the art may be used.

*Negative Holder*

The negative holder E shown in FIG. 1 is mounted on the insert 40 and overlies the opening 48 in the same. The particular construction of the negative holder again forms no feature of the instant invention and the same has not been shown in detail in this application. As to the details of the negative holder, attention is invited to the parent application and to an application for patent of Douglas L. Haviland, Serial No. 797,785, filed March 6, 1959.

*Column*

The column B is shown best in FIGS. 1, 2, 3, 6 and 9 and consists of two posts 51 and 52 which are square in cross section and which are arranged with their corners 54 and 55 lying in a common plane. The corners 56 of these posts are received in V-shaped sockets 57 formed in one of the flanges 42 of the insert 40. Screws 58, FIG. 5, extend through the lower ends of the posts 51 and 52 and are screwed into bosses 61 formed on the insert 40. The posts 51 and 52 are connected together at their upper ends by means of a casting 60. The posts 51 and 52 are secured to said casting by means of cap screws 62 which extend through said posts and are screwed into bosses 63 formed on the casting 60.

The column B in addition to the posts 51 and 52 includes a housing 230. This housing comprises side walls 231 and 232, best shown in FIG. 6, which extend outwardly from the posts 51 and 52. These side walls have lips 233 which overlie the inner surfaces 234 of the posts 51 and 52. Screws 235 extend through these lips and are screwed into the posts. The lateral edges of the side walls 231 and 232 have inwardly turned flanges 236 which are formed with offsets 237. In these offsets is received a back 238 which is secured to said offsets by means of screws 239. To stiffen the walls 231 and 232, the same are provided with channel-shaped ribs 241 which extend throughout the length thereof and which are spot welded to said walls. Attached to the lower ends of these ribs is a transverse frame member 242 which is bolted to the ribs by means of bolts 243. The frame member 242 rests on the table top 30 and is secured thereto by means of screws 244. A cover 245 closes the upper portion of case 230.

Optical Section

Figure 9:
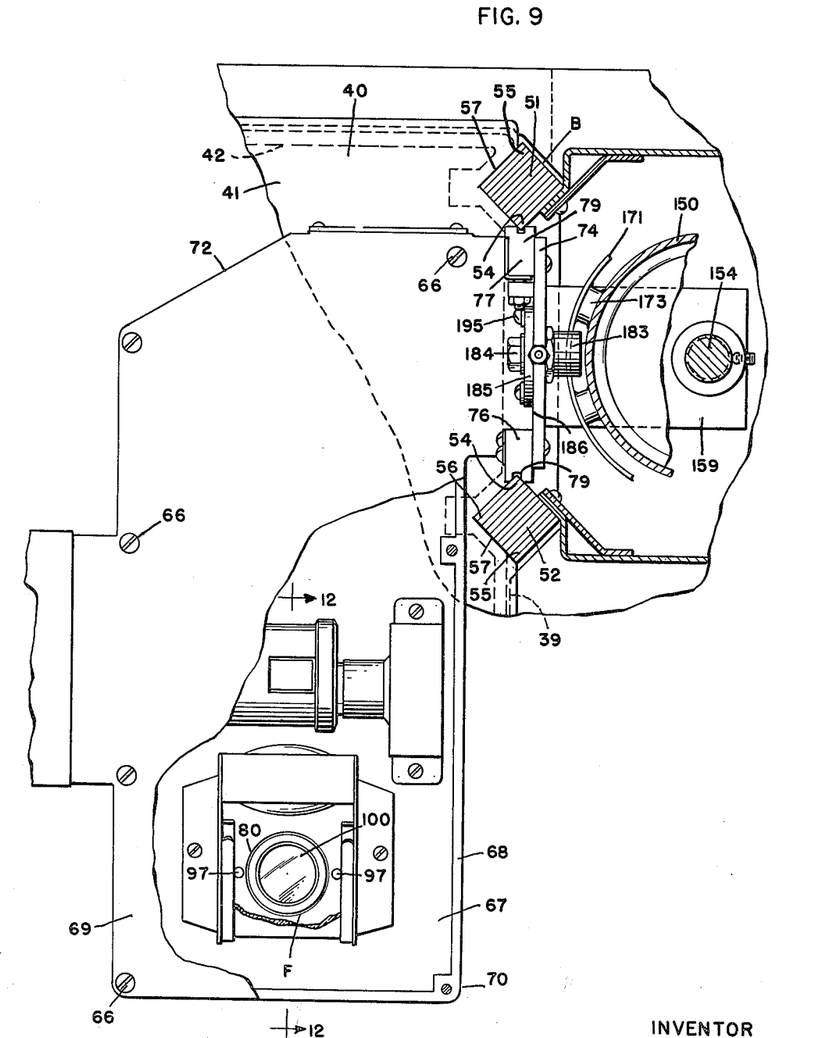
FIG. 9 is a plan sectional view taken on line 9—9 of FIG. 3.
Figure 10:
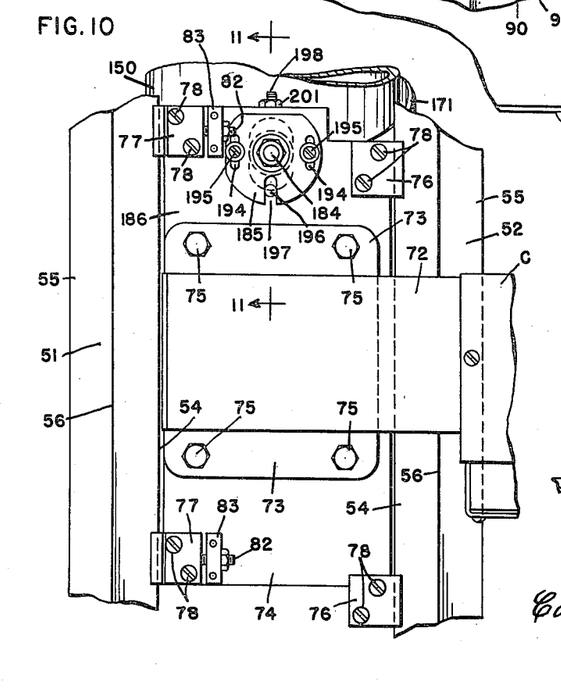
FIG. 10 is a side elevational view showing the manner of supporting the lens section of the invention.
Figure 12:
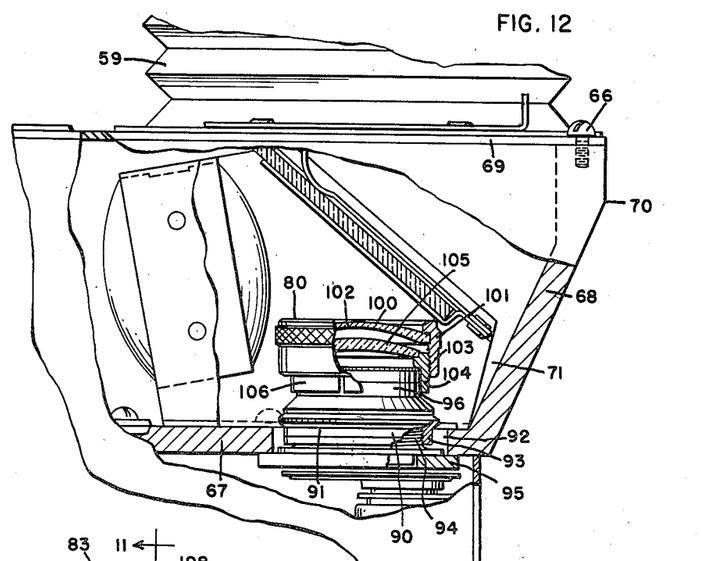
FIG. 12 is a sectional view of the optical system of the invention taken on line 12—12 of FIG. 9.

The optical section F, FIGS. 9 and 12, is mounted in a case in the form of a casting 70 having a compartment 71 in the same. The case 70 is constructed with a bottom 67, a lateral wall structure 68 and a cover 69 secured to said lateral wall structure by means of screws 66. This case is formed with a bracket 72 having flanges 73 disposed at the upper and lower portions of the same. Bolts 75 extending through said flanges secure the brackets 72 to a plate 74 disposed between the two posts 51 and 52 and lying in close proximity to the corners 54 of said posts (FIG. 10). These plates have attached to them guides 76 and 77 by means of screws 78. These guides have U-shaped notches 79 which engage the corners 54 and support the case 70 for sliding movement along said posts. The guides 77 may be adjusted by means of adjusting screws 82 which are screwed into blocks 83 fast on the plate 74 and which engage said guides.

Mounted within the compartment 71 of case 70, as shown in FIG. 12, is an optical system 80 which includes an objective lens system 90 and a compensating lens system 100. The lens system 90 comprises a housing 91 which is received in an opening 92 in the bottom 67 of case 70. The said housing has a threaded flange 93 screwed on a support 94 attached to a plate 95. Plate 95 is detachably secured to the underside of the bottom 67 of case 70 by means of screws 97, FIG. 9. The lens housing 91 further has an upwardly extending barrel 96 for attachment of the compensating lens system 100 thereto. The objective lens system 90 includes suitable lenses for procuring accurate images in the paper section C of the invention and has a focal length of 91 millimeters or 3.6 inches. The commercial objective lens systems available on the market usually deviate to a slight extent in the focal length of the same so that correction is required. The compensating lens system 100 is designed to bring about this compensation for objective lenses having focal length of substantially 3.6 inches and will adjust the actual focal length of the commercial lenses to exactly the nominal focal length.

The compensating lens system 100 includes a lens holder 101 in which is mounted a meniscus lens 102. This lens is constructed of crown glass having surfaces with radii of 4.2 inches and 2.0 inches and being substantially 1.37 inches in diameter. The lens holder 101 is formed with a depending flange 103 which is internally threaded. Mounted within the flange 103 is a lens holder 104 which receives and supports a meniscus lens 105. This lens is also constructed of crown glass and has surfaces with radii 2 inches and 4.136 inches. Lens 102 is constructed so that the central portion of the same is of lesser thickness than the marginal portions while lens 105 is constructed so that the central portion is thicker than the marginal portions. The exterior of lens holder 104 is exteriorly threaded to screw into the flange 103 of lens holder 101. Lens holder 104 has a depending split flange 106 which frictionally engages the barrel 96 of the lens housing 91. By means of this construction, the two lenses 102 and 105 which are normally spaced from one another can be adjusted as to spacing.

Paper Section

Figures 7, 8:
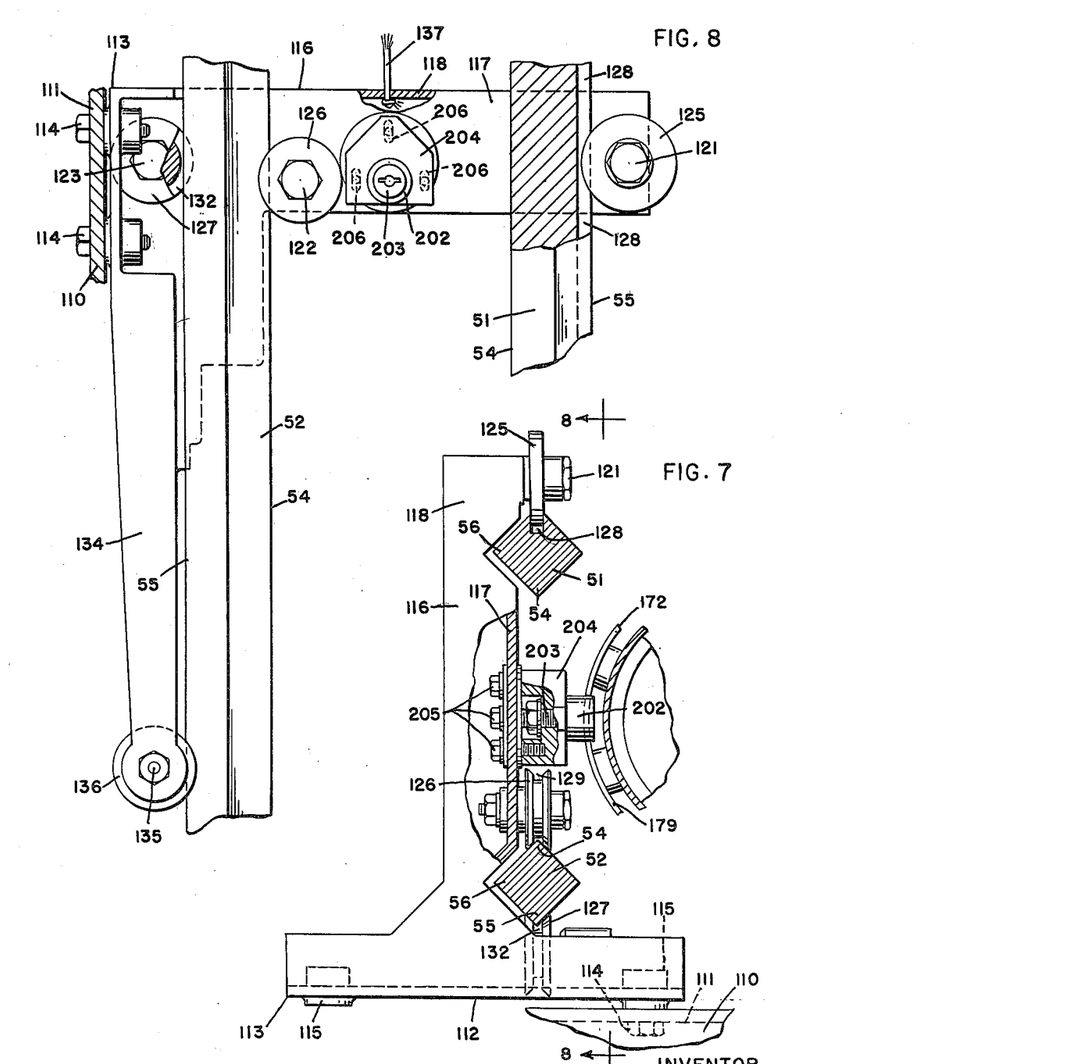
FIG. 7 is a plan sectional view taken on line 7—7 of FIG. 3.
FIG. 8 is a fragmentary elevational side view of the supporting posts of the column and illustrating the manner of supporting the paper section thereon and taken on line 8—8 of FIG. 7.

The paper section C of the invention shown in FIGS. 1, 2 and 7 contains a magazine 40 for storing unprinted paper in the roll, a feed mechanism 41 which directs the paper in position to receive the image transmitted to it by the optical system, and a take-up mechanism 42 which rolls up the printed paper and stores the same for subsequent development. The paper section C is connected to the optical section F by means of a bellows 59. Again, this particular construction forms no feature of the instant invention and has not been illustrated in detail nor will it be further described. However, any paper feeding mechanism such as is now well known in the art may be used for the purpose.

The paper feeding mechanism 41 is mounted in a housing 110 which has a rear wall 111. Attached to this rear wall is the crossbar 112 of a T-shaped bracket 113 (FIG. 7). Bolts 114 extend through this wall and are screwed into bosses 115 formed on the crossbar 112. The bracket 113 includes a stem 116 which is angle-shaped in cross section having a depending flange 117 and a horizontal flange 118. The flange 117 has secured to it stub shafts 121, 122 and 123, FIG. 8, and on which are rotatably mounted rollers 125, 126 and 127. The roller 125 operates in a groove 128 in the post 51. The roller 126 has a V-shaped groove 129 which receives the corner 54 of the post 52. In a similar manner, the roller 127 has a V-shaped groove 132 in it which receives the corner 55 of said post. Depending downwardly from the crossbar 112 at the intersection of the stem 116 therewith is an arm 134 which has secured to the end of it a stub shaft 135. This shaft has rotatably mounted on it a roller 136 which is similar to the rollers 127 and 126 and which engages the corner 55 of the post 52 at a locality below the roller 127. By means of this construction, the entire paper section C is supported for vertical sliding movement relative to the column B. The weight of the entire paper mechanism is counterbalanced by means of a cable 137, FIG. 3, which is attached to the flange 118 of the stem 116. This cable passes upwardly over pulleys 138 and 139 mounted on pintles 141 and 142 carried by the casting 60. The said cable then passes downwardly through an opening 251 in table top 30 and into standard 34 where it has attached to the lower end of the same a counterweight 143 slidable along a guide 144, both of which are disposed in the standard 34 at the rear thereof.

Adjusting Section

Figure 5:
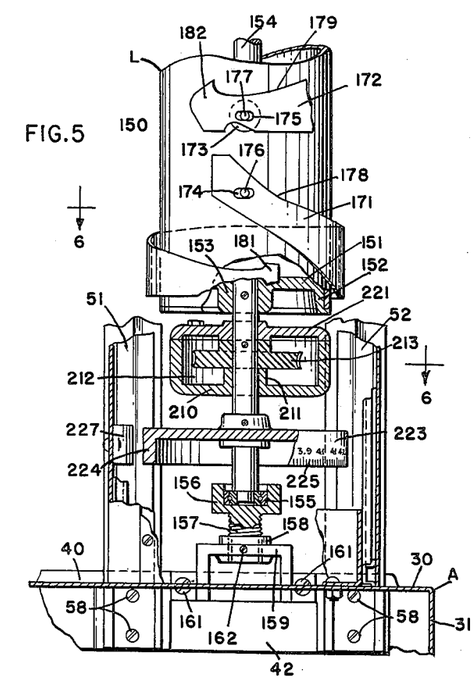
FIG. 5 is an elevational sectional view taken on line 5—5 of FIG. 3 and drawn to a greater scale.
Figure 6:
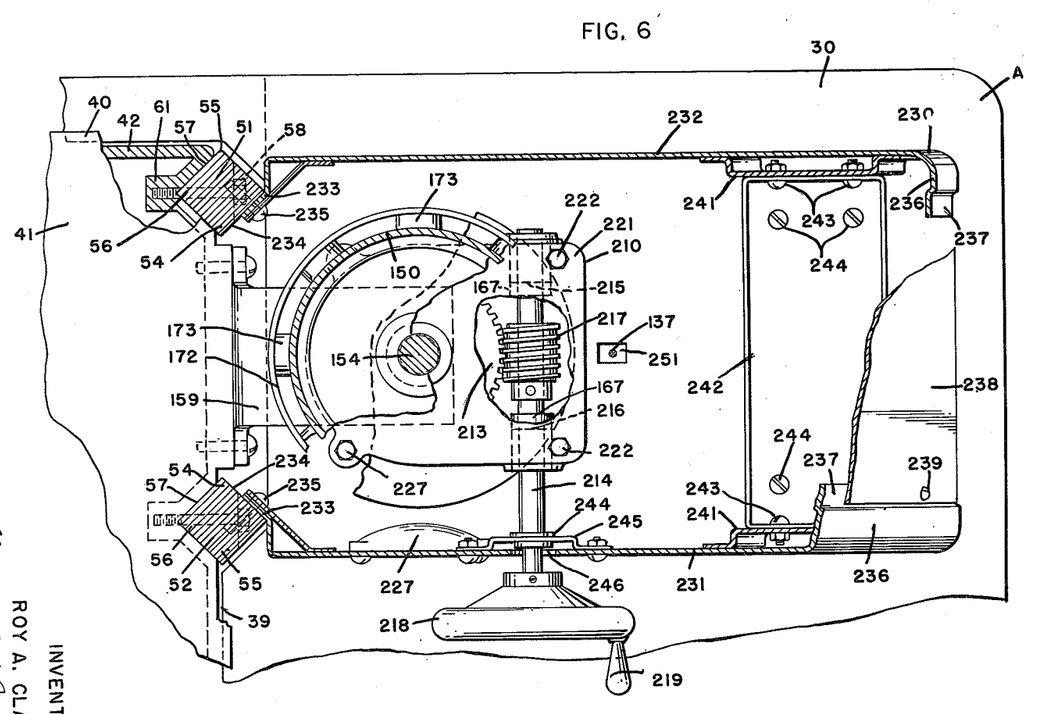
FIG. 6 is a plan sectional view taken on line 6—6 of FIG. 5.

The adjusting section L comprises a drum 150, best shown in FIGS. 3, 5 and 6, which has heads 151 secured to the upper and lower ends of the same. Said heads 151 are formed with flanges 152 which are received within the ends of said drum and with bosses 153 receiving a driving shaft 154. The lower end of shaft 154 is mounted in an end thrust bearing 155 which is received in a cup 156. This cup has a threaded stem 157 which screws into a boss 158 formed on a bracket 159 secured to the flange 42 of the insert 40 by means of screws 161. The cup 156 may be held in adjusted position by means of a set screw 162 screwed into the boss 158 and engaging the stem 157. The upper end of the shaft 154 is journaled in a bearing 163 formed in the casting 60 and which may slide longitudinally and rotate within said bearing.

The drum 150 has mounted on it two helical cams 171 and 172. These cams are spaced from the outer surface of the drum by means of spacers 173 which are welded to said drum. At the localities of certain of said spacers the cams are formed with slots 174 and 175 which extend in planes at right angles to the axis of the drum. Extending through these slots are pins 176 and 177 which are driven into the spacers 173 and which roughly position the cams on the drum. The drum and cams are assembled in a jig to hold the same in proper relationship and the cams welded to the spacers. The cams 171 and 172 have cam surfaces 178 and 179 which extend helically along the same and which vary in lead throughout the lengths thereof. The lead of the cam surface 178 at the lower end of the same is relatively small while at the upper end of the same it increases considerably. The same is true with the cam 172 which has a great lead at its upper end and a lesser lead at its lower end. The cams 171 and 172 are designed in a manner such that the distances between the sections for various sizes of prints with the images in focus is determined by the formulae $d1 = (M+1)f$ and $$d2 = \frac{(M+1)}{M} f$$

where $d1$ and $d2$ are the distances between the lens and the paper and between the lens and the negative, M is the magnification and $f$ is the focal length of the objective lens system. Stops 181 and 182 at the lower ends of said cams limit the travel of the cam followers with reference thereto. The surfaces 178 and 179 of cams 171 and 172 after attachment are ground to predetermined dimensions according to accurate templates and are then ready for use.

Figure 11:
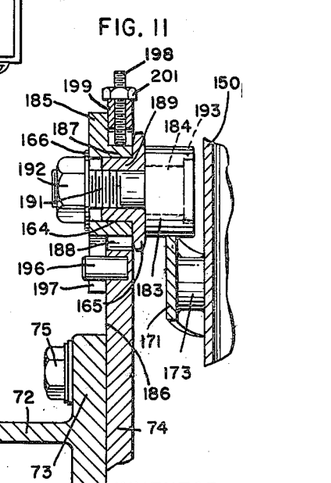
FIG. 11 is a sectional view taken on line 11—11 of FIG. 10 and drawn to a greater scale.

The cam surface 178 of cam 171 is engaged by a roller 183 and which serves as a cam follower for the optical section F and best shown in FIGS. 9, 10 and 11. This roller is mounted on a shouldered stub shaft 184, which is attached to a disc 185 overlying the outer surface 186 of plate 74. This disc has a boss 187 which is slidably mounted in a vertical slot 188 in the plate 74. The boss 187 has an eccentric bushing 189 mounted in a bore 164 therein and which has a flange 165 overlying the end of said boss. A nut 192 screwed on the threaded end 191 of said shaft engages a washer 166 overlying the bore 164 in boss 187 and clamps the parts in position. By means of the boss 187 the roller 183 may be vertically adjusted and by means of bushing 189 said roller may be horizontally adjusted. Extending through slots 194 in the disc 185 are screws 195 which are screwed into the plate 74. A pin 196 attached to the plate 74 is slidable in a slot 197 in the disc 185. By means of this construction, the roller 183 may be adjusted in a vertical direction. Adjustment is procured by means of an adjusting screw 198 which is screwed into the upper portion 199 of plate 74 and is held in position by means of a lock nut 201.

For adjusting the paper section C, a cam follower 202 in the form of a roller is employed which is best shown in FIGS. 7 and 8. This cam follower is mounted on a stub shaft 203 which is attached to a fitting 204 in a manner similar to the stub 184. The fitting 204 is secured to the flange 117 of the bracket 113 by means of bolts 205. Bolts 205 pass through vertically extending slots 206 in the flange 117 and are screwed into the fitting 204. The said fitting may be adjusted vertically by means of this construction. The roller 202 engages the cam surface 179 of cam 172.

The cams 171 and 172 may be rotated by means of the following construction, best shown in FIGS. 5 and 6. A case 210 has a boss 211 and through which the shaft 154 extends and rotates relative to. This case has a compartment 212 within the same and in which is located a worm gear 213 which is mounted upon and secured to said shaft. Also mounted in the case 210 is a countershaft 214 which is journaled in bearings 215 and 216 also mounted in said case. Collars 167 secured to said shaft and engaging bearings 215 and 216 restrain axial movement of said shaft. The shaft 214 has secured to it a worm 217 which meshes with the worm gear 213. Rotation of the shaft 214 causes the shaft 154 to rotate and with it the drum 150 and the cams 171 and 172. This procures vertical movement of the optical section F and the paper section C with relation to one another and to the negative holder E. The cam surfaces 178 and 179 are so designed that the optical section and the paper section are moved in proper relation to cause the image from the negative to focus upon the printing paper at different positions of the optical system with reference to the negative holder so as to produce enlargements of the image on the prints. A hand wheel 218 is attached to the outer end of the shaft 214 and has a handle 219 by means of which the same may be readily rotated. The shaft 214 is journaled in a bearing 244 mounted on a reinforcing member 245 welded to the wall 231 of housing 230. Shaft 214 extends through an opening 246 in the wall 231 and the wheel 218 is disposed on the exterior of said wall. A cover 221 is attached to the case 210 by means of cap screws 222 extending through said cover and screwed into the case 210. Shaft 154 also extends through this cover.

The cams 171 and 172 are so constructed that the degree of enlargement can be accurately determined by the angular position of shaft 154. For this purpose a wheel 223 is provided, FIG. 5, which is attached to the shaft 154 below the case 210. This wheel has a flange 224 and on which is placed marks 225 with corresponding indicia designating the amount of enlargement and forming a magnification scale. By means of the construction disclosed and the cams employed, a print can be made of the same size as the negative or enlargements varying in size upwardly therefrom to a ratio of 1 to 5. The marks 225 on the wheel 223 are visible through a window 226, FIG. 3, in the side wall 231 of the housing 230. The window 226 has a lens 227 mounted in the same, FIG. 6, and by means of which the marks and indicia on the flange 224 of wheel 223 may be more accurately read. These marks register with a pointer 228 scribed on said lens, FIG. 3.

The operation of the invention is entirely automatic. The operator sets the drum 150 for the size of enlargement desired by rotating hand wheel 218 and reading the proper degree of enlargement through the window 226. If the negative has been properly set in the negative holder E, the foot switch 22 is operated and the exposure is made.

In the setting up of the machine, the compensating lens system 100 is adjusted until the focus is exactly 3.6 inches to correct the variation in the objective lens systems commercially furnished. Since the cams 171 and 172 are designed for a focal length of 3.6 inches, the apparatus will thereafter function in the desired manner, the focal length of the objective lens system having been corrected by the compensating lens system to a focal length of exactly 3.6 inches.

The advantages of the invention are manifest. In prior printers it has been impossible to produce auto-focus prints of a one to one ratio. The instant invention overcomes this disadvantage and without causing binding or excessive strain on the parts when the parts arrive at the one to one magnification ratio or less. By means of the compensating lens system employed, substantially perfect focus can be produced throughout the range of the printer. Also, one set of cams can be used for all lens systems and any of the preadjusted optical lens systems may be readily used therewith. Rotation of the drum is directly proportional to the magnification and a wheel with magnification indicia is provided which may be accurately calibrated to indicate the magnification at any setting of the drum. There is no back lash between the moving parts and the same mark on the calibrated wheel will indicate the correct magnification whether the optical section and paper section are being moved toward or from the negative. By means of the various adjustments provided, the parts may be manufactured by mass production methods and correction for variation in form and size made during assembly.

Changes in the specific form of the invention, as herein described, may be made within the scope of what is claimed without departing from the spirit of the invention.

Having described the invention, what is claimed as new and desired to be protected by Letters Patent is:

1. In an auto-focus projection printer having a supporting structure, an optical section including an objective lens system having a focal length differing within commercial tolerances of a selected focal length, an illuminated negative section and a paper section, one of said sections being fixed relative to said supporting structure, means for guiding the other two sections for related movement relative to one another and to the said fixed section along the optical axis of the objective lens system, a mechanical movement acting between said sections and supporting structure constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising two spaced lenses and means for guiding said lenses for relative movement in small increments along the optical axis of the objective lens system whereby a combined lens system having the selected focus for which the mechanical movement was constructed is produced.

2. In an auto-focus projection printer having a supporting structure, an optical section including an objective lens system having a focal length differing within commercial tolerances of a selected focal length, an illuminated negative section and a paper section, one of said sections being fixed relative to said supporting structure, means for guiding the other two sections for related movement relative to one another and to the said fixed section along the optical axis of the objective lens system, a mechanical movement acting between said sections and supporting structure constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising two spaced lenses, one of said lenses being a meniscus lens and means for guiding said lenses for relative movement in small increments along the optical axis of the objective lens system whereby a combined lens system having the selected focus for which the mechanical movement was constructed is produced.

3. In an auto-focus projection printer having a supporting structure, an optical section including an objective lens system having a focal length differing within commercial tolerances of a selected focal length, an illuminated negative section and a paper section, one of said sections being fixed relative to said supporting structure, means for guiding the other two sections for related movement relative to one another and to the said fixed section along the optical axis of the objective lens system, a mechanical movement acting between said sections and supporting structure constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising two spaced meniscus lenses and means for guiding said lenses for relative movement in small increments along the optical axis of the objective lens system whereby a combined lens system having the selected focus for which the mechanical movement was constructed is produced.

4. In an auto-focus projection printer having a supporting structure, an optical section including an objective lens system having a focal length differing within commercial tolerances of a selected focal length, an illuminated negative section and a paper section, one of said sections being fixed relative to said supporting structure, means for guiding the other two sections for related movement relative to one another and to the said fixed section along the optical axis of the objective lens system, a mechanical movement acting between said sections and supporting structure constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising two spaced meniscus lenses both arranged with their concave surfaces facing the objective lens system and means for guiding said lenses for relative movement in small increments along the optical axis of the objective lens system whereby a combined lens system having the selected focus for which the mechanical movement was constructed is produced.

5. In an auto-focus projection printer having a supporting structure, an optical section including an objective lens system having a focal length differing within commercial tolerances of a selected focal length, an illuminated negative section and a paper section, one of said sections being fixed relative to said supporting structure, means for guiding the other two sections for related movement relative to one another and to the said fixed section along the optical axis of the objective lens system, a mechanical movement acting between said sections and supporting structure constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising a positive meniscus lens and a negative meniscus lens, spaced from one another, and means for guiding said lenses for relative movement in small increments along the optical axis of the objective lens system whereby a combined lens system having the selected focus for which the mechanical movement was constructed is produced.

6. In an auto-focus projection printer having a supporting structure, an optical section including an objective lens system having a focal length differing within commercial tolerances of a selected focal length, an illuminated negative section and a paper section, one of said sections being fixed relative to said supporting section, means for guiding the other two sections for related movement relative to one another and to the said fixed section along the optical axis of the objective lens system, a mechanical movement acting between said sections constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising a positive meniscus lens and a negative meniscus lens, spaced from one another, said negative lens having a focal length in the range of one hundred percent and eighty percent of the focal length of the positive lens and means for guiding said lenses for relative movement in small increments along the optical axis of the objective lens system whereby a combined lens system having the selected focus for which the mechanical movement was constructed is produced.

7. In an auto-focus projection printer having a supporting structure, an optical section including an objective lens system having a focal length differing within commercial tolerances of a selected focal length, an illuminated negative section and a paper section, one of said sections being fixed relative to said supporting section, means for guiding the other two sections for related movement relative to one another and to the said fixed section along the optical axis of the objective lens system, a mechanical movement acting between said sections constructed to cause proper focus of the image on the paper in the paper section with a lens system of the selected focus and for all sizes of the image within the limits of the printer, the combination of a compensating lens system operating in conjunction with said objective lens system and operative to provide either positive or negative correction to compensate for variations between the selected focal length and the actual focal length of the objective lens system, said compensating lens system comprising a positive meniscus lens and a negative meniscus lens, spaced from one another, the lens nearest the paper having a shorter focal length than the other and means for guiding said lenses for relative movement in small increments along the optical axis of the objective lens system whereby a combined lens system having the selected focus for which the mechanical movement was constructed is produced.

References Cited in the file of this patent
UNITED STATES PATENTS

| | | |
|---|---|---|
| 1,169,731 | Mengel | Jan. 25, 1916 |
| 1,645,367 | August | Oct. 11, 1927 |
| 2,266,908 | Rogers | Dec. 23, 1941 |
| 2,346,490 | Huebner | Apr. 11, 1944 |
| 2,380,818 | Young Berg | July 31, 1945 |
| 2,418,230 | Jacobson | Apr. 1, 1947 |
| 2,465,692 | Martisson | Mar. 29, 1949 |
| 2,518,727 | Simmons | Aug. 15, 1950 |
| 2,572,992 | Doornbos | Oct. 30, 1951 |
| 2,589,680 | Denny | Mar. 18, 1952 |
| 2,679,189 | Burns | May 25, 1954 |
| 2,938,427 | Alves | May 31, 1960 |
| 2,985,066 | Hauptvogel et al. | May 23, 1961 |

FOREIGN PATENTS

| | | |
|---|---|---|
| 195,965 | Great Britain | Mar. 13, 1924 |
| 786,406 | France | Sept. 3, 1935 |